United States Patent Office 3,813,450
Patented May 28, 1974

3,813,450
PREPARATION OF GERANYL COMPOUNDS
Ted Symon, Lombard, Ill., assignor to Universal Oil
Products Company, Des Plaines, Ill.
No Drawing. Filed Feb. 11, 1972, Ser. No. 225,672
Int. Cl. C07c 21/02
U.S. Cl. 260—654 R                         7 Claims

ABSTRACT OF THE DISCLOSURE

Geranyl compounds are prepared by telomerizing a prenyl compound and isoprene in the presence of a solid metal oxide catalyst.

---

This invention relates to a process for the preparation of a geranyl compound, and particularly to a process for producing a geranyl halide in the presence of certain solid metal oxide catalysts.

Heretofore, many aroma compositions, such as perfumes, have depended, to a great extent, upon naturally occurring compounds which are blended or formulated to prepare final compositions of matter which have pleasing and pleasant fragrances. For example, perfumes which comprise a mixture of organic compounds which include, for example, alcohols, aldehydes, ketones, esters and hydrocarbons, are all combined and fixed so that the odors of the finished compounds will combine to produce a harmonious fragrance. Some of these compounds which are blended together have been prepared from rose petals, geranium petals, or other flower petals which possess distinctive fragrance; and thus, the product thereof is dependent upon nature as pertaining to the growing season, the harvesting of the crops as well as climatic conditions which will insure either an abundant crop or may in some instances, insure a poor or sparse crop of the desired flower. Therefore, in order to insure a continued and certain supply of various aromatic compounds, it is necessary to synthesize compounds which possess the desired odor. By utilizing these synthetic compounds in place of the naturally occurring compounds, it is possible to prepare aroma chemicals which may be blended or used in formulations which are thereafter utilized in the perfume and soap industry for preparing the finished formulations which are used to scent soaps, detergents, talcums, perfumes, colognes, etc.

It has now been discovered that certain compounds such as geranyl derivatives may be prepared by telomerizing a prenyl halide with isoprene at telomerizing conditions in the presence of certain catalysts. Specifically speaking a prenyl halide may be telomerized with isoprene to produce a mixture of terpenic halides including, as a major portion thereof, a geranyl halide such as geranyl chloride or geranyl bromide. In addition, another portion of the mixture will comprise a linalyl halide which is also a desirable product. The geranyl halides may then be treated in any manner well known in the art to produce other geranyl derivatives such as geranyl butyrate which has a rose-type odor or geranyl formate which has a similar rose-type odor. Likewise geranyl acetate may be prepared which has an odor of lavender, all of the above compounds being thereafter used in various formulations to produce the desired fragrance.

It is therefore an object of this invention to provide a process for the preparation of geranyl compounds.

A further object of this invention is to provide a process for preparing a geranyl halide utilizing certain catalytic compositions of matter of a type hereinafter set forth in greater detail.

In one aspect an embodiment of this invention resides in a process for the preparation of a geranyl halide which comprises telomerizing a prenyl halide with isoprene at telomerizing conditions in the presence of a solid metal oxide catalyst, and recovering the resultant geranyl halide.

A specific embodiment of this invention is found in a process for the preparation of geranyl chloride which comprises telomerizing prenyl halide in the presence of isoprene at a temperature ranging from about 0° to about 200° C. and a pressure in the range of from about atmospheric to about 100 atmospheres, in the presence of a catalyst comprising gamma-alumina, and recovering the resultant geranyl chloride.

Other objects and embodiments will be found in the following further detailed description of the present invention.

As hereinbefore set forth the present invention is concerned with a process for preparing geranyl compounds and particularly geranyl halides by reacting a prenyl halide (1-halo-3-methyl-2-butene) and isoprene in the presence of certain catalysts. Heretofore, the reaction has been effected in the presence of certain Lewis acids such as the Friedel-Crafts type metal halides including aluminum chloride, ferric chloride, zinc chloride, tin chloride, titanium chloride, etc. However, in contradistinction to this, it has now been discovered that the telomerization reaction between a prenyl halide and isoprene may be effected in the presence of a solid metal oxide catalyst. By utilizing these solid metal oxide catalysts in granular or pill form, it will be possible to effect the reaction in a more attractive commercial form, the separation of the desired product from the catalyst being accomplished in a relatively easy manner as compared to the separation process which is required when utilizing prior art processes. As hereinbefore set forth this will render the present process more attractive and more feasible to operate in a relatively inexpensive manner. It is to be understood that the term "solid metal oxide catalyst" as used in the present specification and appended claims will refer to metal oxides and mixtures of metal oxides. The solid metal oxide catalysts as used in the present process are subjected to a pre-process calcination in which the solid metal oxides are subjected to said calcination at a relatively high temperature, that is a temperature above about 500° C. and preferably in a range of from about 500° to about 600° C. By subjecting the metal oxides to this calcination process prior to use thereto in the present process, it is possible to start with a relatively inexpensive form of metal oxide, a particular example of this being gamma-alumina, which when subjected to the relatively high temperatures of calcination, is converted to a material which possesses the desired catalytic activity. In addition to utilizing alumina as a telomerization catalyst, it is also considered within the scope of this invention to use other metal oxides such as silica or mixtures of metal oxides including silica-alumina, silica-alumina-magnesia, silica-alumina-zirconia, silica-zirconia, silica-zirconia-magnesia, etc.

The telomerization reaction is effected at conditions which will include a temperature in the range of from about 0° to about 200° C. or more and at a pressure in the range of from about atmospheric up to about 100 atmospheres. In the preferred embodiment of the invention, the reaction is effected at ambient temperatures, that is, from about 18° to about 22° C. However, if temperatures in the upper portion of the range hereinbefore set forth are employed, it is contemplated that the reaction will be effected at superatmospheric pressures. These superatmospheric pressures are afforded by the introduction of an inert gas such as nitrogen into the reaction zone, the amount of pressure which is employed being that which is sufficient to maintain a major portion of the reactants in a liquid phase. In addition, the reaction is preferably effected in an organic medium, the medium being afforded by an inert organic solvent which may comprise a paraffinic hydrocarbon such as n-pentane, n-hexane, n-heptane, etc.; a cycloparaffinic hydrocarbon such as cyclopentane, methylcyclopentane, cyclohexane, etc., or an aromatic hydrocarbon such as benzene, toluene, o-xylene, m-xylene, p-xylene or mixtures thereof, ethylbenzene, etc. Furthermore, the prenyl chloride and isoprene which are subjected to the telomerization reaction are usually present in the reaction mixture in equimolar amounts.

The process of this invention in which a prenyl halide and isoprene are subjected to a telomerization reaction may be effected in any suitable manner and may comprise either a batch or continuous type operation. For example, when a batch type operation is used a quantity of the starting material comprising the prenyl halide and the isoprene along with the solid metal oxide catalyst and the solvent are placed in a reaction vessel, the particular make-up of the vessel being dependent upon whether atmospheric or superatmospheric pressures are to be employed to effect the reaction. For example, when utilizing a reaction which is to be effected at atmospheric pressure, the starting materials may be charged to a reaction vessel which may, if so desired, be immersed in an ice bath whereby the temperature at the start-up of the reaction is subambient in nature. Inasmuch as the telomerization reaction is exothermic in nature it may be preferable to employ these subambient temperatures in order to control the rate of the reaction. In contradistinction to this, if the reaction is to be effected at superatmospheric pressures the starting materials may be charged to an autoclave which may be of the rotating or stirred type and which contains a solid metal oxide catalyst of the type hereinbefore set forth in greater detail. The vessel is then sealed, nitrogen is pressed in until the desired operating pressure has been reached and the autoclave is then heated to the desired temperature. In either case, upon completion of the desired residence time, which may range from 0.5 up to about 24 hours or more in duration, the reaction vessel, either a flask or autoclave, is allowed to return to room temperature. If the reaction is effected at superatmospheric pressures, the apparatus is vented to remove any excess pressure which still may be present, the reaction vessel is opened and the reaction mixture is recovered therefrom. The aforesaid reaction mixture is then subjected to conventional means of separation and recovery, whereby the desired geranyl halide may be recovered. The conventional means of separation which may be utilized will include filtration to remove the catalyst, washing, drying and fractional distillation under reduced pressure, whereby the desired product is separated from any unreacted starting material and/or side products which may have been formed during the reaction. It is to be noted that due to the particular make-up of the catalyst which may be in granular or pill form, it is possible to separate said catalyst from the organic portion of the reaction mixture in a relatively easy and economical fashion. This is in contrast to the separation which must be employed when utilizing a Friedel-Crafts type metal halide catalyst which is soluble in the solvent or reactants. Due to its solubility in the solvent or reactants, it is necessary to employ more complicated fractionation methods whereby the catalyst must be removed from the desired product.

It is also contemplated within the scope of this invention that the telomerization process may be effected in a continuous manner of operation. For example, due to the solid nature of the metal oxide which is employed as the catalyst, it is possible to effect the continuous manner of operation in several forms. One particular type of continuous operation which may be employed comprises the fixed bed type in which the catalyst is disposed as a fixed bed in the reaction zone which is maintained at the proper operating conditions of temperature and pressure. The isoprene and prenyl chloride along with the particular inert solvent are continuously charged to the reactor through separate lines, or in the alternative, the reactants may be admixed prior to entry into said reactor and charged thereto in a single stream along with the solvent. The charge stock is passed through the reactor in either an upward or downward flow and upon completion of the desired residence time the reactor effluent is continuously withdrawn from the reactor and subjected to separation means of the type hereinbefore set forth in greater detail whereby the geranyl chloride may be recovered from any unwanted side reaction products which may have been formed and unreacted starting material, the latter being recycled to form a portion of the feed stock. Another type of continuous type of operation which may be employed in the process of this invention comprises the moving bed type of operation in which the catalyst and the reactants are passed through the reaction zone either concurrently or countercurrently to each other. Yet another type of continuous operation which may be used comprises the slurry type of operation in which the catalyst is carried into the reaction zone as a slurry in one or both of the starting reactants. In the latter types of operation the reactor effluent is also continuously withdrawn from the reaction zone and treated in a manner similar to that described for the treatment of the reactor effluent when using a fixed bed type of operation. As in the case of the batch type operation, it should be noted that by utilizing the solid metal oxide catalysts in a continuous manner, it is easier to separate the desired product from the catalyst in a more economical and feasible manner.

The following examples are given to illustrate the process of the present invention which, however, are not intended to limit the generally broad scope of the present invention in strict accordance therewith.

EXAMPLE I

To a three-necked alkylation flask was added 136 g. (2.01 mole) of isoprene, 210 g. (2.02 mole) of prenyl chloride and 200 g. of cyclohexane. In addition 30 g. of a silica-alumina catalyst which had been previously calcined at a temperature in excess of 500° C., said catalyst being in the form of ⅛ inch pills, was also placed in the flask. The reaction mixture was continuously stirred for a period of 3 hours at a temperature in the range of from about 18° to about 22° C. At the end of the aforementioned residence time, the reaction mixture was separated from the solid catalyst by filtration and subjected to fractional distillation under reduced pressure whereby the desired product comprising geranyl chloride was recovered.

EXAMPLE II

To illustrate the operability of a continuous process, 26 g. of a silica-alumina catalyst similar to that used in Example I above was placed in a reactor which was maintained at ambient temperature (about 18° to about 22° C.). The starting material comprising 82 g. (1.21 mole) of isoprene and 127 g. (1.22 mole) of prenyl chloride along with 216 g. of cyclohexane were continuously charged to the reactor at a liquid hourly space velocity (the amount of charge per amount of catalyst per hour) of 1, said charge taking place during a period of 7 hours. At the end of the charge time, the flow of reactants to the reactor was halted and the reaction mixture recovered. This mixture was again subjected to fractional distillation whereby the desired product comprising geranyl chloride was separated from unreacted isoprene and prenyl chloride.

EXAMPLE III

To an alkylation flask containing 30 g. of a catalyst comprising gamma-alumina pills which have been calcined prior to use at a temperature of above about 500° C. is added 136 g. (2.0 mole) of isoprene, 274 g. (2.0 mole) of prenyl bromide and 200 g. of cyclohexane. The mixture is agitated for a period of 3 hours at ambient temperature. At the end of this time the reaction mixture is separated from the alumina catalyst by filtration and the filtrate is subjected to fractional distillation under reduced pressure whereby the desired product comprising geranyl bromide is recovered therefrom.

I claim as my invention:

1. A process for the preparation of a geranyl halide which comprises reacting a prenyl halide with isoprene, said prenyl halide and isoprene being present in about equimolar amounts, at a temperature in the range of from about 0° to about 200° C. and a pressure in the range of from about atmospheric to about 100 atmospheres in the presence of an alumina, or silica-alumina catalyst calcined at a temperature above about 500° C., and recovering the resultant geranyl halide.

2. The process as set forth in claim 1 in which said catalyst is alumina.

3. The process as set forth in claim 2 in which said alumina is gamma-alumina.

4. The process as set forth in claim 1 in which said catalyst is silica-alumina.

5. The process as set forth in claim 1 in which said prenyl halide is prenyl chloride and said geranyl halide is geranyl chloride.

6. The process as set forth in claim 1 in which said prenyl halide is prenyl bromide and said geranyl halide is geranyl bromide.

7. The process set forth in claim 1 in which the catalyst is calcined at a temperature of from about 500° C. to about 600° C.

References Cited

UNITED STATES PATENTS 3,290,397  12/1966  Rust et al. _____ 260—654 R

LEON ZITVER, Primary Examiner

J. A. BOSKA, Assistant Examiner